United States Patent [19]

Kato et al.

[11] Patent Number: 5,235,953
[45] Date of Patent: Aug. 17, 1993

[54] IGNITION TIMING CONTROL SYSTEM FOR INTERNAL COMBUSTION ENGINES

[75] Inventors: Akira Kato; Yasuyuki Kimura; Yoshitaka Takasuka, all of Wako, Japan

[73] Assignee: Honda Giken Kogyo Kabushiki Kaisha, Tokyo, Japan

[21] Appl. No.: 981,695

[22] Filed: Nov. 25, 1992

[30] Foreign Application Priority Data

Nov. 29, 1991 [JP] Japan .................................. 3-340296

[51] Int. Cl.$^5$ .............................................. F02P 5/14
[52] U.S. Cl. ................................................ 123/425
[58] Field of Search ...................... 123/425, 435; 73/35, 73/35 K, 35 P, 117.3; 364/431.08, 431.07

[56] References Cited

U.S. PATENT DOCUMENTS

| | | | |
|---|---|---|---|
| 5,090,382 | 2/1992 | Bolander et al. | 123/425 |
| 5,101,790 | 4/1992 | Takasu et al. | 123/425 |
| 5,107,813 | 4/1992 | Inoue et al. | 73/35 KR |
| 5,134,980 | 8/1992 | Sakakibara et al. | 123/425 |
| 5,144,929 | 9/1992 | Hosoya et al. | 364/431.08 |
| 5,165,378 | 11/1992 | Miyashita | 123/425 |
| 5,170,762 | 12/1992 | Tsutumi et al. | 123/425 |
| 5,186,145 | 2/1993 | Sakakibara | 123/425 |

FOREIGN PATENT DOCUMENTS 4-101067  4/1992  Japan .

Primary Examiner—Raymond A. Nelli
Attorney, Agent, or Firm—Nikaido, Marmelstein, Murray & Oram

[57] ABSTRACT

An ignition timing control system for an internal combustion engine includes an ECU which calculates a knocking correction value in response to an output from a knocking sensor, and an advance limit value in response to engine operating conditions. The ECU operates to limit correction of the ignition timing of the engine in an advancing direction, beyond the advance limit value when the knocking correction value exceeds the advance limit value. The ECU carries out the advance correction limitation when the engine load exceeds a first predetermined value. Further, the ECU sets a predetermined reference value more advanced than the advance limit value, in response to engine operating conditions. and when the engine load exceeds a second predetermined value, it modifies the knocking correction value in the ignition timing-advancing direction toward the predetermined reference value and cancels the advance correction limitation when the knocking correction value has been modified to the predetermined reference value while knocking is not detected.

7 Claims, 12 Drawing Sheets

| NE \ PBA | PBKN0 | | PBKN1 |
|---|---|---|---|
| NECT0 | DADV 00 | 01 | 02 |
| NECT1 | 10 | 11 | 12 |
| NECT2 | 20 | 21 | 22 |
| NECT3 | 30 | 31 | 32 |
| | 40 | 41 | 42 |

IGNITION TIMING CONTROL SYSTEM FOR INTERNAL COMBUSTION ENGINES

BACKGROUND OF THE INVENTION

1. Field of the Invention

This invention relates to an ignition timing control system for an internal combustion engine having means for prevention of knocking irrespective of the octane value of fuel used in the engine.

2. Prior Art

Generally, if a fuel having a low octane value is used in an internal combustion engine which is designed to operate on a fuel having a high octane value, knocking can occur with considerable frequency. To overcome this problem, an ignition timing control system for an internal combustion engine has been proposed by the assignee of the present application by Japanese Provisional Patent Publication (Kokai) No. 4-101067, which comprises means for detecting occurrence of knocking, and means for retarding the ignition timing when occurrence of knocking is detected.

In the proposed control system, a plurality of control zones different in the ignition timing control characteristic according to the octane value of a fuel used are provided, by which the amount of advance of ignition timing is restricted under predetermined conditions, and the ignition timing is separately controlled in each of the control zones selected by an ignition timing retarding amount determined according to the degree of occurrence of knocking. When load on the engine exceeds a predetermined value while knocking does not occur, the use of the control zones is canceled by making a changeover from a control zone which is currently applied to a control zone suitable for a fuel having a higher octane value, i.e. to a control zone where the ignition timing can be set to a more advanced value, to thereby enable to control the ignition timing in a manner suitable to the octane value of the fuel used without causing hunting in the controlled ignition timing.

However, in the above proposed system, the predetermined value of load on the engine is set to such a high value that the changeover of the control zone is effected only when the engine is in a highly loaded condition where knocking can occur in the engine if a fuel having a low octane value is used. Therefore, when a vehicle on which the engine is installed is traveling at a high altitude where the load on the engine normally assumes values lower than the predetermined value and accordingly the load on the engine can scarcely exceed the predetermined value, no changeover of the control zone will be effected, once a control zone has been selected according to the ignition timing retarding amount, which results in degraded driveability. More specifically, while the ignition timing retarding amount is calculated so as to secure a required level of driveability, and ignition timing control is effected based on the calculated retarding amount in control zones suitable for respective octane values of the fuel used selected by the retarding amount, it is impossible to change a control zone once the control zone has been selected. This brings about a problem of degraded driveability when a wrong or inappropriate control zone is erroneously selected.

To solve this problem, one would be propose to set the predetermined value of the load on the engine to a lower value. However, if the predetermined value is simply set to a lower value, this results in another inconvenience that the frequency of changeover of the control zone increases, causing hunting in the controlled ignition timing when a fuel having a low octane value is used.

Further, in the above proposed system, control zones are selected irrespective of load on the engine. Therefore, if a control zone is erroneously selected when the engine is operating in a low load condition in which knocking can scarcely occur, the ignition timing may be controlled in a control zone corresponding to a low octane value even if a fuel having a high octane value is used, so that desired engine output cannot be obtained. Moreover, once the control zone has been selected, it is not canceled unless the load on the engine exceeds the predetermined value, which prevents ignition timing control from being carried out in a desired manner.

SUMMARY OF THE INVENTION

It is the object of the invention to provide an ignition timing control system for an internal combustion engine, which is capable of controlling the ignition timing in a manner suitable to the octane value of a fuel used, while avoiding degradation of the driveability.

To attain the above object, the present invention provides an ignition timing control system for an internal combustion engine, including operating condition-detecting means for detecting operating conditions of the engine including load on the engine, basic ignition timing-calculating means responsive to operating conditions of the engine detected by the operating condition detecting means, for calculating a basic value of ignition timing of said engine, knocking detecting means for detecting knocking occurring in the engine, knocking correction value-calculating means responsive to results of knocking detection from the knocking detecting means for calculating a knocking correction value for correcting the ignition timing of the engine, advance limit-calculating means responsive to operating conditions of the engine detected by the operating condition-detecting means, for calculating an advance limit value, and advance correction-limiting means for limiting correction of the ignition timing of the engine in a direction of advancing the ignition timing, beyond the advance limit value when the knocking correction value exceeds the advance limit value.

The ignition timing control system according to the invention is characterized by an improvement wherein the advance correction-limiting means operates when the load on the engine detected by the operating condition-detecting means exceeds a first predetermined value.

Preferably, the ignition timing control system includes reference value-setting means responsive to operating conditions of the engine detected by the operating condition-detecting means, for setting a predetermined reference value more advanced than the advance limit value, and advance correction limitation-cancelling means operable when the load on the engine exceeds a second predetermined value, for modifying the knocking correction value in the ignition timing-advancing direction toward the predetermined reference value and cancelling the limitation of the correction of the ignition timing in the ignition timing-advancing direction when the knocking correction value has been modified to the predetermined reference value while knocking is not detected by the knocking detecting means.

Further preferably, the second predetermined value is set on a lower load side than the first predetermined value.

In a preferred embodiment of the invention, the advance correction-limiting means comprises means for providing a plurality of control zones suitable for respective different octane values of fuel used in the engine, each of the control zones being defined by an upper limit value and a lower limit value of a retarding amount by which the ignition timing is to be corrected in an ignition timing-retarding direction.

The advance limit-calculating means calculates the lower limit of the retarding amount of each of the control zones as the advance limit value.

The advance correction limitation-cancelling means cancels the limitation of the correction of the ignition timing in the ignition timing-advancing direction, by changing one of the control zones which is suitable for a fuel having a lower octane value to another one of the control zones which is suitable for a fuel having a higher octane value, when the load on the engine exceeds the second predetermined value.

The advance correction-limiting means includes zone changing means for changing one of the control zones which is suitable for a fuel having a higher octane value to another one of the control zones which is suitable for a fuel having a lower octane value, when the load on the engine exceeds the first predetermined value and at the same time the knocking correction value exceeds the upper limit value of the retarding amount.

The above and other objects, features and advantages of the invention will become more apparent from the ensuing detailed description taken in conjunction with the accompanying drawings.

DETAILED DESCRIPTION

The invention will now be described in detail with reference to the drawings showing an embodiment thereof.

Figure 1:
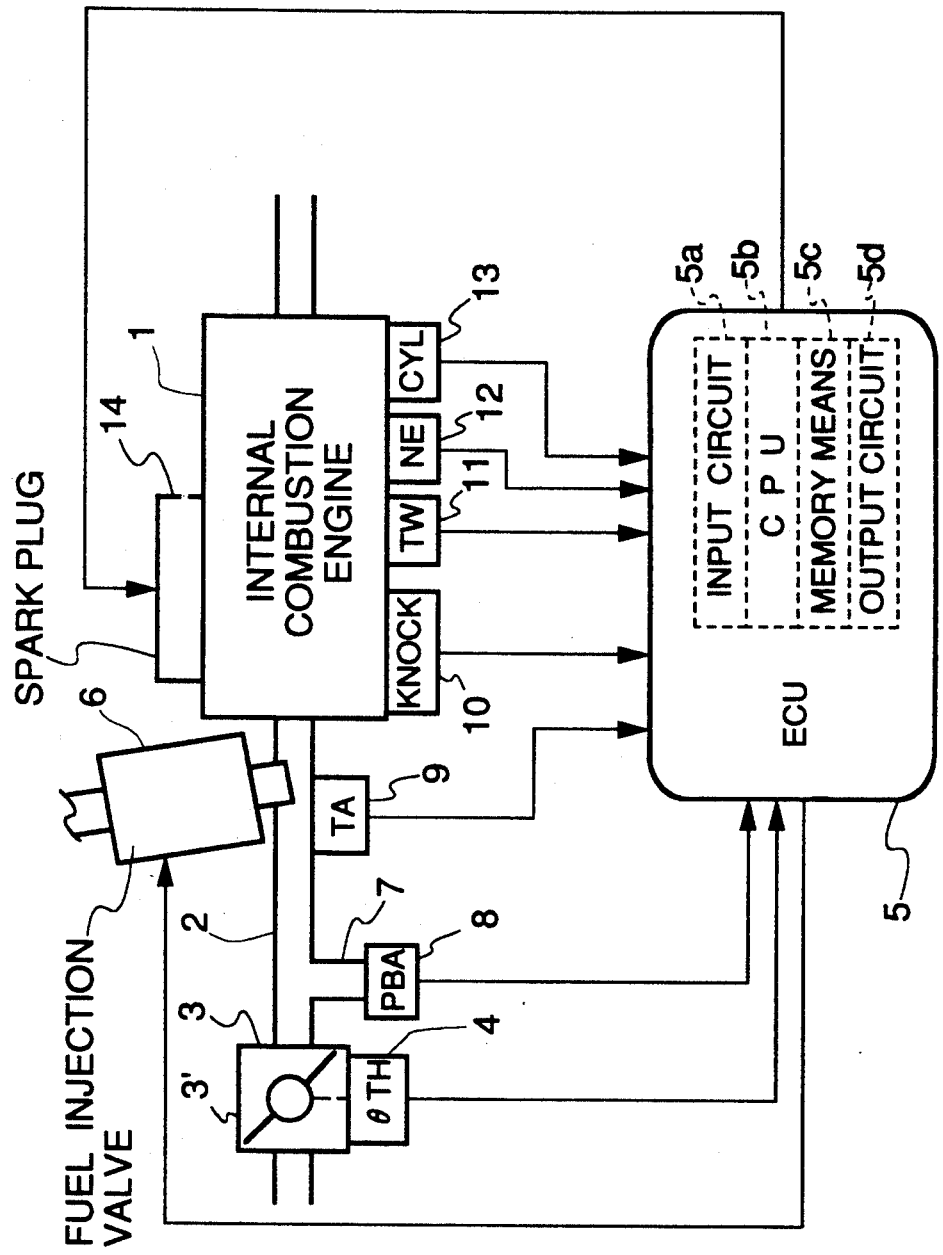
FIG. 1 is a block diagram showing the whole arrangement of an ignition timing control system incorporated in an internal combustion engine, according to an embodiment of the invention.

Referring first to FIG. 1, there is shown the whole arrangement of an ignition timing control system incorporated in an internal combustion engine, according to an embodiment of the invention.

In the figure, reference numeral 1 designates a DOHC straight type four cylinder engine (hereinafter simply referred to as "the engine"), each cylinder being provided with a pair of intake valves and a pair of exhaust valves, not shown. In an intake pipe 2 of the engine, there is arranged a throttle body 3 accommodating a throttle valve 3' therein. A throttle valve opening ($\theta$TH) sensor 4 is connected to the throttle valve 3' for generating an electric signal indicative of the sensed throttle valve opening and supplying same to an electronic control unit (hereinafter referred to as the ECU") 5.

Fuel injection valves 6 are each provided for each cylinder and arranged in the intake pipe 2 between the engine 1 and the throttle valve 3, and at a location slightly upstream of the intake valves. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is mounted at an end of a branch conduit 7 branching off from the intake pipe 2 at a location immediately downstream of the throttle valve 3', for sensing absolute pressure (PBA) within the intake pipe 2, and is electrically connected to the ECU 5 for supplying an electric signal indicative of the sensed absolute pressure PBA to the ECU 5.

An intake air temperature (TA) sensor 9 is inserted into the intake pipe 2 at a location downstream of intake pipe absolute pressure sensor 8 for supplying an electric signal indicative of the sensed intake air temperature TA to the ECU 5.

A knocking (KNOCK) sensor 10 of a piezo-electric type is inserted into a cylinder block of the engine 1 at a location in the vicinity of a top dead center position of each cylinder for detecting vibration of the engine caused by knocking and supplying an electric signal indicative of the detected vibration to the ECU 5.

An engine coolant temperature sensor (TW) sensor 11, which may be formed of a thermistor or the like, is mounted in the coolant-filled cylinder block of the engine for supplying an electric signal indicative of the sensed engine coolant temperature TW to the ECU 5.

An engine rotational speed (NE) sensor 12 and a cylinder-discriminating (CYL) sensor 13 are arranged in facing relation to a camshaft or a crankshaft of the engine 1, neither of which is shown. The NE sensor 11 generates a pulse as a TDC signal pulse at each of predetermined crank angles whenever the crankshaft rotates through 180 degrees, while the CYL sensor 12 generates a pulse at a predetermined crank angle of a particular cylinder of the engine, both of the pulses being supplied to the ECU 5.

A spark plug 14 for each cylinder of the engine 1 is electrically connected to the ECU 5 to have ignition timing thereof controlled by a signal supplied therefrom.

The ECU 5 comprises an input circuit 5a having the functions of shaping the waveforms of input signals from various sensors mentioned above, shifting the voltage levels of sensor output signals to a predetermined level, converting analog signals from analog-output sensors to digital signals, and so forth, a central processing unit (hereinafter referred to as the "CPU") 5b, memory means 5c formed of a ROM storing various operational programs which are executed by the CPU 5b, and various maps, referred to hereinafter, and a RAM for storing results of calculations therefrom, etc., an output circuit 5d which outputs driving signals to the fuel injection valves 6 and the spark plugs 14.

The CPU 5b calculates a valve opening period or fuel injection period TOUT over which the fuel injection valves 6 are to be opened, and also controls the ignition timing $\theta$IG in response to operating conditions of the engine, while effecting retarding thereof to avoid occurrence of knocking when required.

Figure 2:
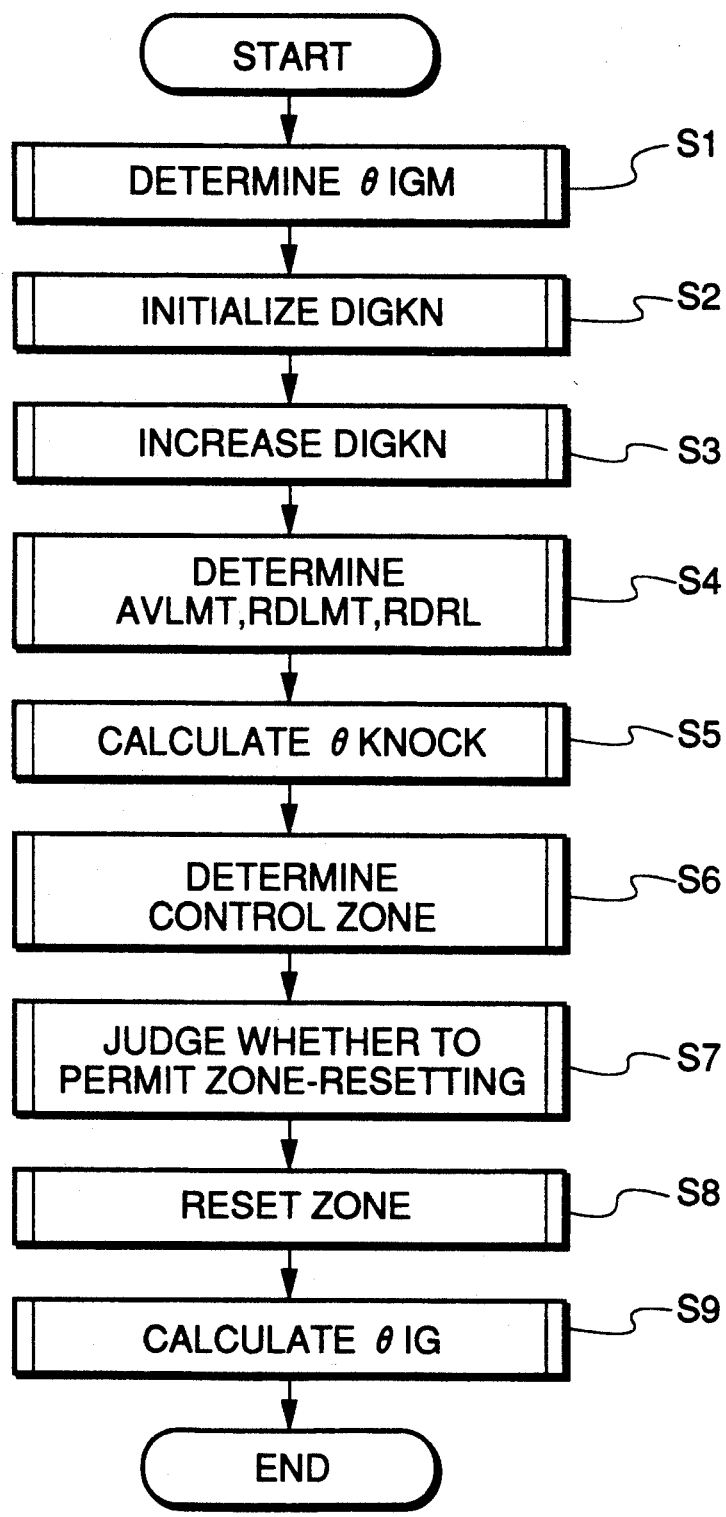
FIG. 2 is a flowchart showing a main routine of an ignition timing control program for carrying out ignition timing control by the ignition timing control system shown in FIG. 1.

FIG. 2 shows a main routine of an ignition timing control program for calculating the ignition timing, which is executed in synchronism with generation of TDC signal pulses.

First, at a step S1, a basic ignition timing advance value (basic ignition timing) $\theta$IGM is determined. The basic ignition timing advance value $\theta$IGM is determined as a function of engine operating parameters, e.g. the engine rotational speed NE and the intake pipe absolute pressure PBA representative of load on the engine. In the present embodiment, the basic ignition timing advance value $\theta$IG is determined by retrieving an ignition timing map, not shown, stored in the memory means 5c according to the engine rotational speed NE and the intake pipe absolute pressure PBA.

Then, at a step S2, a correction value-determining variable DIGKN is initialized. The correction value-determining variable DIGKN is a variable used in calculating a knocking correction value $\theta$KNOCK which is set in response to occurrence of knocking. In the present embodiment, the variable DIGKN is initialized in each of three control zones having different ignition timing control characteristics suitable to respective octane values of the fuel used, the control zones being described in detail hereinafter.

At the following step S3, changing of the correction value-determining variable DIGKN initialized at the step S2, in an ignition timing retarding direction is carried out (ignition timing-retarding modification).

Figure 3:
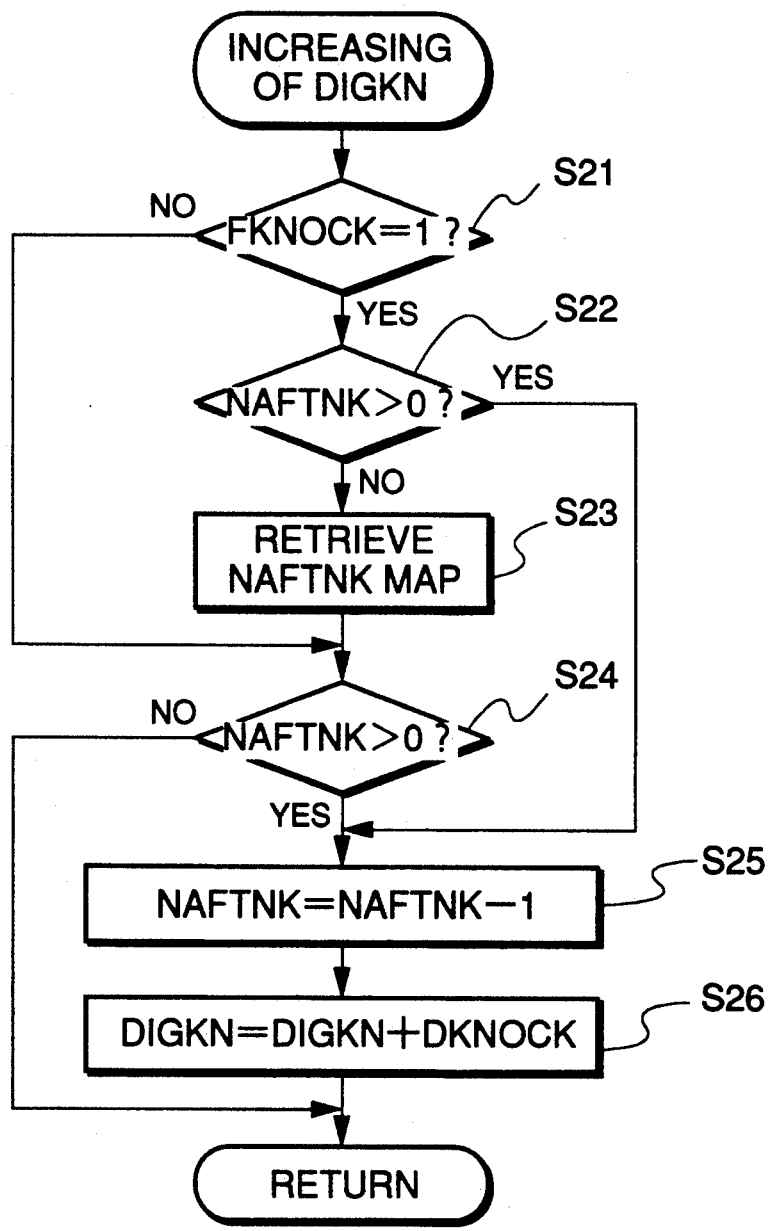
FIG. 3 is a flowchart showing a subroutine for ignition timing-retarding correction modification of a correction value-determining variable DIGKN.
Figures 4, 12:
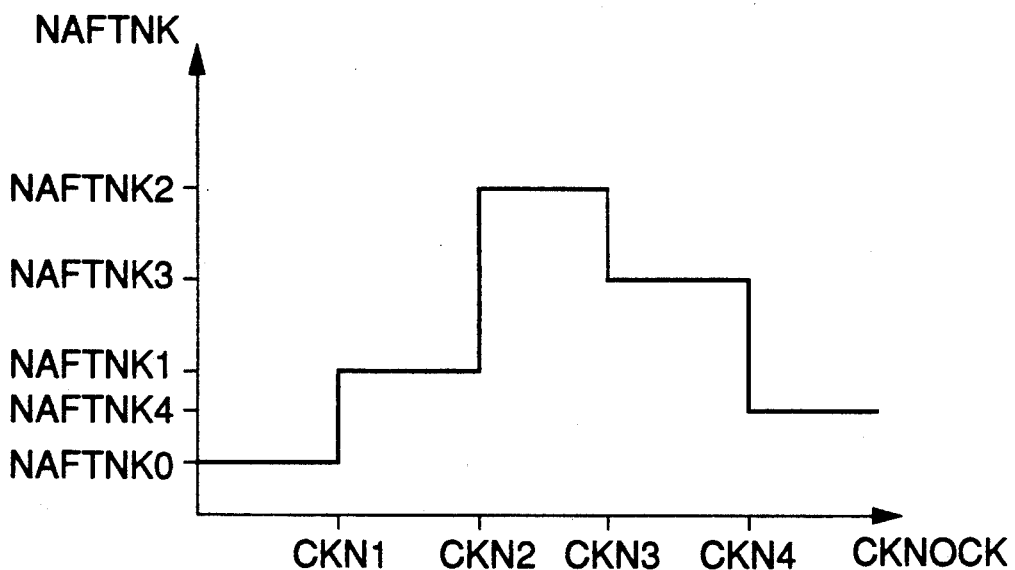
FIG. 4 is an NAFTNK map for determining a continuous retarded ignition time number NAFTNK.
FIG. 12 shows a map of an advance unit amount DADV.

FIG. 3 shows a subroutine for ignition timing-retarding modification of the variable DIGKN. First, at a step S21, it is determined whether or not a flag FKNOCK, which is set to a value of 1 upon occurrence of knocking, assumes the value of 1 to thereby determine whether knocking has occurred. If the answer is negative (NO), i.e. if knocking has not occurred, the program jumps to a step S24. If the answer is affirmative (YES), i.e. if knocking has occurred, it is determined at a step S22 whether or not a continuous retarded ignition time number NAFTNK for continuous retarded ignitions, which is indicative of the number of times of ignitions at retarded timing which are to be continuously effected, is greater than 0. If the answer is affirmative (YES), i.e. if NAFTNK>0, the program jumps to a step S25, whereas if the answer is negative (NO), i.e. if NAFTNK$\leq$0, a value of the retarded ignition time number NAFTNK is read from an NAFTNK map. The NAFTNK map is set, e.g. as shown in FIG. 4, such that optimum values NAFTNK0 to NAFTNK4 of the retarded ignition time number NAFTNK are provided, corresponding, respectively, to count values CKN1 to CKN4 of a knocking frequency counter CKNOCK. The knocking frequency counter CKNOCK counts a number of times of occurrence of knocking within a time period corresponding to a predetermined number of times of ignitions effected (e.g. 120).

Then, the program proceeds to the step S24, where it is determined whether or not the read time number NAFTNK is greater than 0. If the answer is negative (NO), i.e. if NAFTNK$\leq$0, the program is immediately terminated without effecting retarding correction of the variable DIGKN. If the answer is affirmative (YES), i.e. if NAFTNK>0, the value of NAFTNK is decremented by 1 at the step S254, and then a retard unit amount DKNOCK (e.g. 0.234°) is added to the variable DIGKN to thereby change the retarding modification amount in the increasing or retarding direction at a step S26, followed by terminating the program.

According to the program of FIG. 3 described above, the variable DIGKN is corrected in the increasing (retarding) direction by the retard unit amount DKNOCK until the time number NAFTNK set corresponding to the frequency of occurrence of knocking becomes 0.

Returning to the main routine, at a step S4 in FIG. 2, advance limits AVLMT, retard side-discriminating values RDLMT, and cancellation-determining (hereinafter referred to as "zone reset-determining") values (predetermined reference values) RDRL are determined. Each of the values AVLMT, RDLMT, RDRL comprises two or three values allocated to respective control zones, hereinafter referred to. In the present embodiment, three control zones are provided, in which the ignition timing control is carried out according to respective different control characteristics, i.e. respective different allowable advance limits. These zones are changed or canceled (reset) when the ignition timing retarding amount reaches the values RDRL, as hereinafter described.

Figure 5:
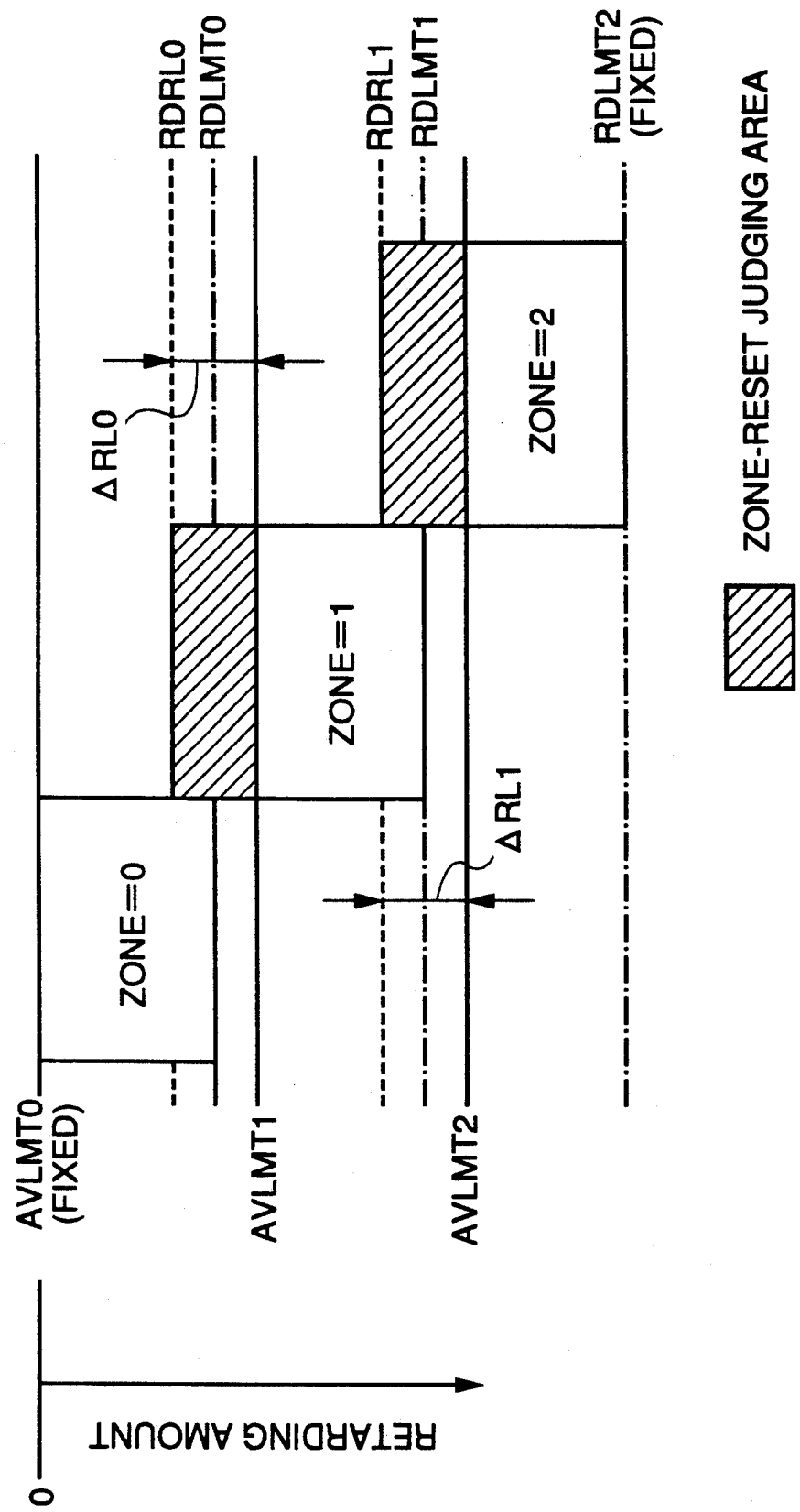
FIG. 5 is a diagram showing control zones.

In the present embodiment, as shown in FIG. 5, three control zones 0, 1 and 3 are provided, which correspond, respectively, to different octane values of fuel used in the engine. More specifically, the control zone 0 has an ignition timing control characteristic suitable for the use of fuel having an octane value of approximately 100, the control zone 1 approximately 95, and the control zone approximately 92. The greater the zone number, the later the ignition timing, as shown in FIG. 5. Advance limits AVLMT0, AVLMT1 and AVLMT2 define the advance-side limits of the control zones 0 to 2, respectively. For example, basically, if the control zone 2 holds, the ignition timing cannot be set to an earlier timing than the advance limit AVLMT2. The advance limit AVLMT0 of the control zone 0 corresponds to the basic ignition timing $\theta$IGM, which means that the retarding amount is 0.

Further, the control zones 0 to 2 are provided with retard side-discriminating values RDLMT0, RDLMT1, and RDLMT2, respectively. The first and second retard side-discriminating values RDLMT0, RDLMT1 are variable and set by adding an addend, which is set in accordance with the engine rotational speed, as described hereinafter, to the advance limit AVLMT0 or AVLMT1, while the discriminating value RDLMT2 on the most retarded side is a fixed value. The correction value $\theta$KNOCK is controlled in these control zones between the advance limit AVLMTn (n=0 to 2) and the retard side-discriminating value RDLMTn (n=0 to 2).

Further, the control zones 0 to 2 are also provided with first and second zone reset-determining values RDRL0 and RDRL1, which are set to respective values obtained by decreasing the advance limits AVLMT1, AVLMT2 by amounts ΔRL0, ΔRL1, i.e. the values RDRL0, RDRL1 are more advanced than the advance limits AVLMT1, AVLMT2, by the amounts ΔRL0, ΔRL1, respectively. In FIG. 5, the hatched portions designate zone reset-judging regions in which it is determined whether or not the control zone should be changed from 2 to 1 or 1 to 0. The control zone is reset when the correction value θKNOCK assumes a value equal to or smaller or more advanced than the zone reset-determining values RDRL0, RDRL1 after it is corrected toward an advanced side from the advance limits AVLMT1, AVLMT2, respectively, and at the same time the load on the engine is greater than a predetermined value while knocking does not occur.

Figure 6:
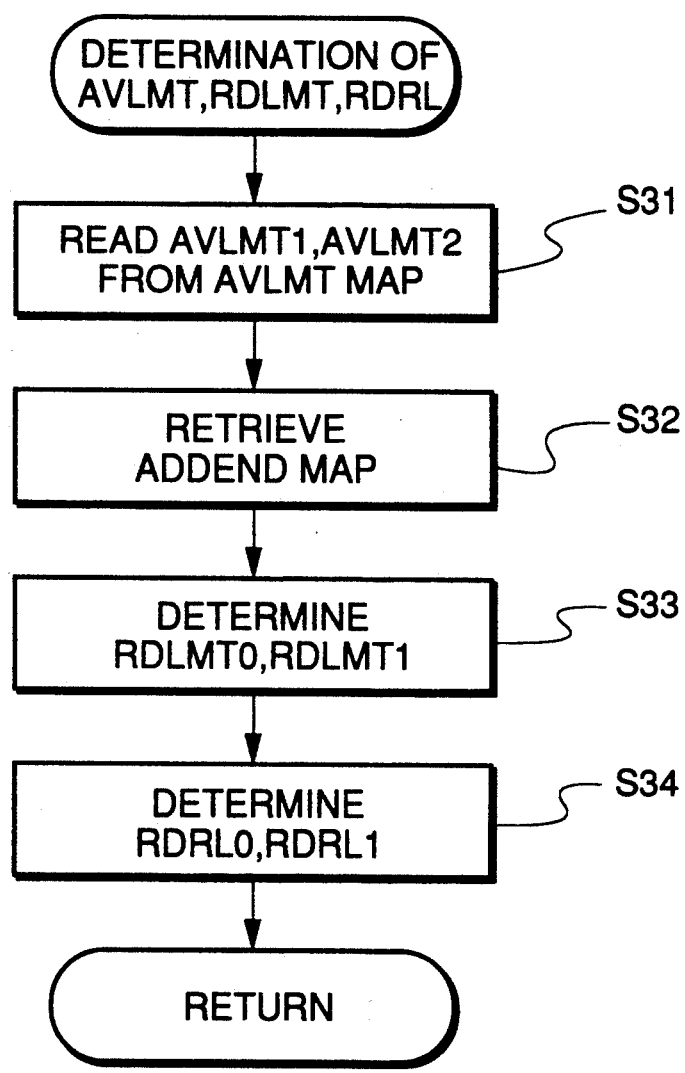
FIG. 6 is a flowchart showing a subroutine for determining control zone-defining values AVLMT, RDLMT and RDRL.

FIG. 6 shows a subroutine for determining the advance limits AVLMT1, AVLMT2, the first and second retard side-discriminating values RDLMT0, RDLMT1, and the first and second zone reset-determining values RDRL0, RDRL1.

First, at a step S31, the advance limits AVLMT1, AVLMT2 are determined by retrieving an AVLMT map, not shown, which is set such that values of the advance limits AVLMT1, AVLMT2 are provided, which correspond, respectively, to values of the engine rotational speed NE and values of the engine intake pipe absolute pressure PBA.

Then, RDLMT-setting addend values and RDRL-setting addend values are determined by retrieving respective addend value maps, not shown, in which values of the addend values are provided, which correspond, respectively, to values of the engine rotational speed NE, at a step S32. Then, the RDLMT-setting addend values are added at a step S33 to the advance limits AVLMT1, AVLMT2 to obtain the first and second retard side-discriminating values RDLMT0, RDLMT1, and the RDRL-setting addend values are added at a step S34 to obtain the zone reset-determining values RDRL0, RDRL1, followed by terminating the subroutine and returning to the main routine in FIG. 2.

Then, at a step S5, the knocking corrrection value θKNOCK for correcting or retarding the ignition timing θIG for avoiding occurrence of knocking is calculated.

Figure 7:
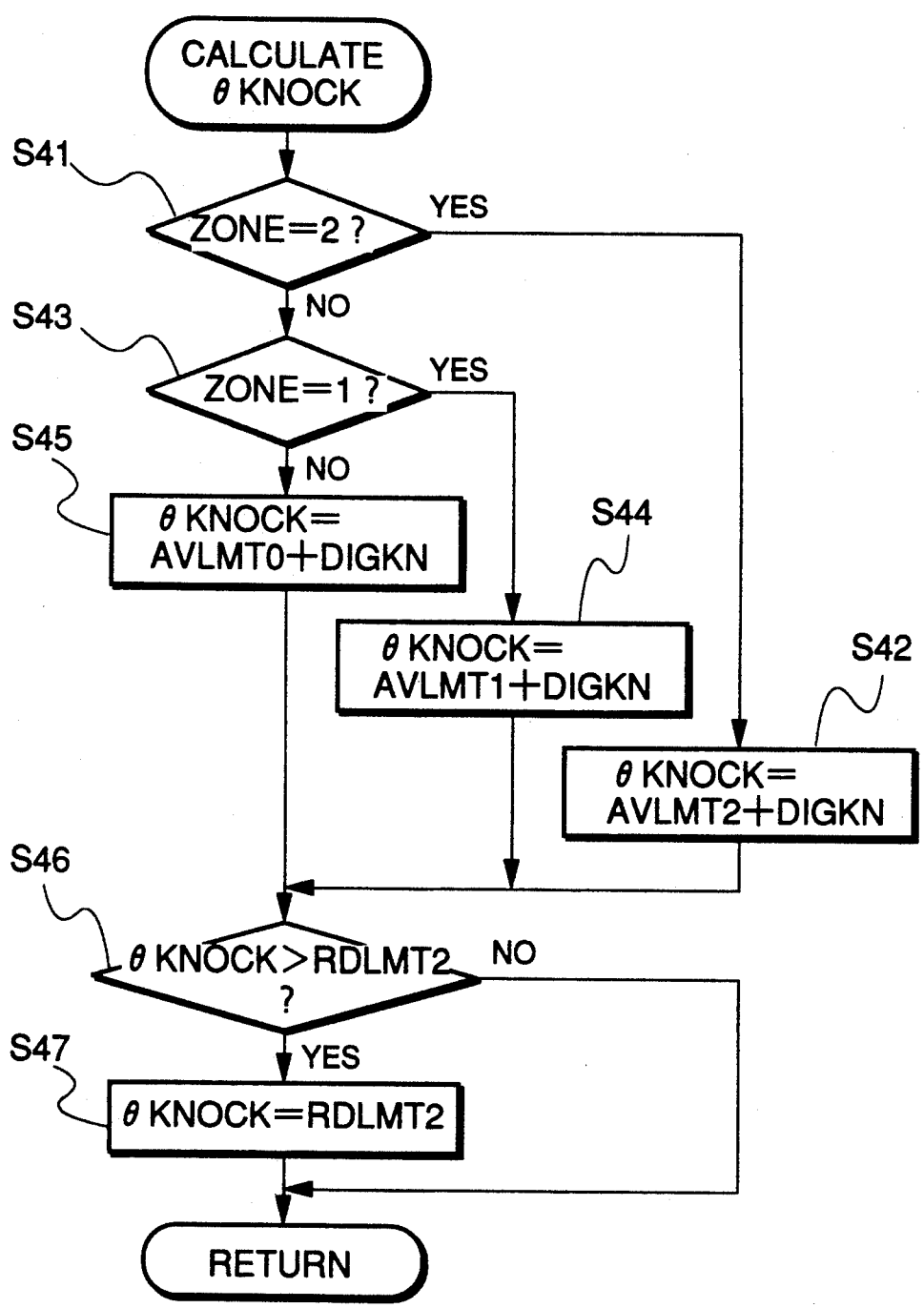
FIG. 7 is a flowchart showing a subroutine for determining a knocking correction value $\theta$KNOCK.

FIG. 7 shows a subroutine for calculating the knocking correction value θKNOCK.

First, at a step S41, it is determined whether or not the control zone 2 is used in the present loop. If the answer is affirmative (YES), the correction value-determining variable DIGKN is added to the advance limit AVLMT2 of the control zone 2 to obtain the correction value θKNOCK, followed by the program proceeding to a step S46, whereas if the answer is negative (NO), the program proceeds to a step S43, where it is determined whether the control zone 1 is used in the present loop. If the answer to this question is affirmative (YES), the variable DIGKN is added to the advance limit AVLMT1 of the zone 1 to obtain the correction value θKNOCK, followed by the program proceeding to the step S46, whereas if the answer is negative (NO), which means the control zone 0 is used in the present loop, the variable DIGKN is added to the advance limit AVLMT0 (=θIGM) to obtain the correction value θKNOCK, followed by the program proceeding to the step s46.

At the step S46, it is determined whether or not the correction value θKNOCK obtained at the step S42, S44, or S45 is greater than the retard side-discriminating value RDLMT2 on the most retarded side defining the retard limit of the correction value θKNOCK. If the answer is negative (NO), the program is immediately terminated, whereas if the answer is affirmative (YES), the correction value θKNOCK is set to the retard side-discriminating value RDLMT2 at a step S47, followed by terminating the program and returning to the main routine.

Then, at a step S6 of the main routine, the control zone is determined or reset according to the correction value θKNOCK obtained at the step S5.

Figure 8:
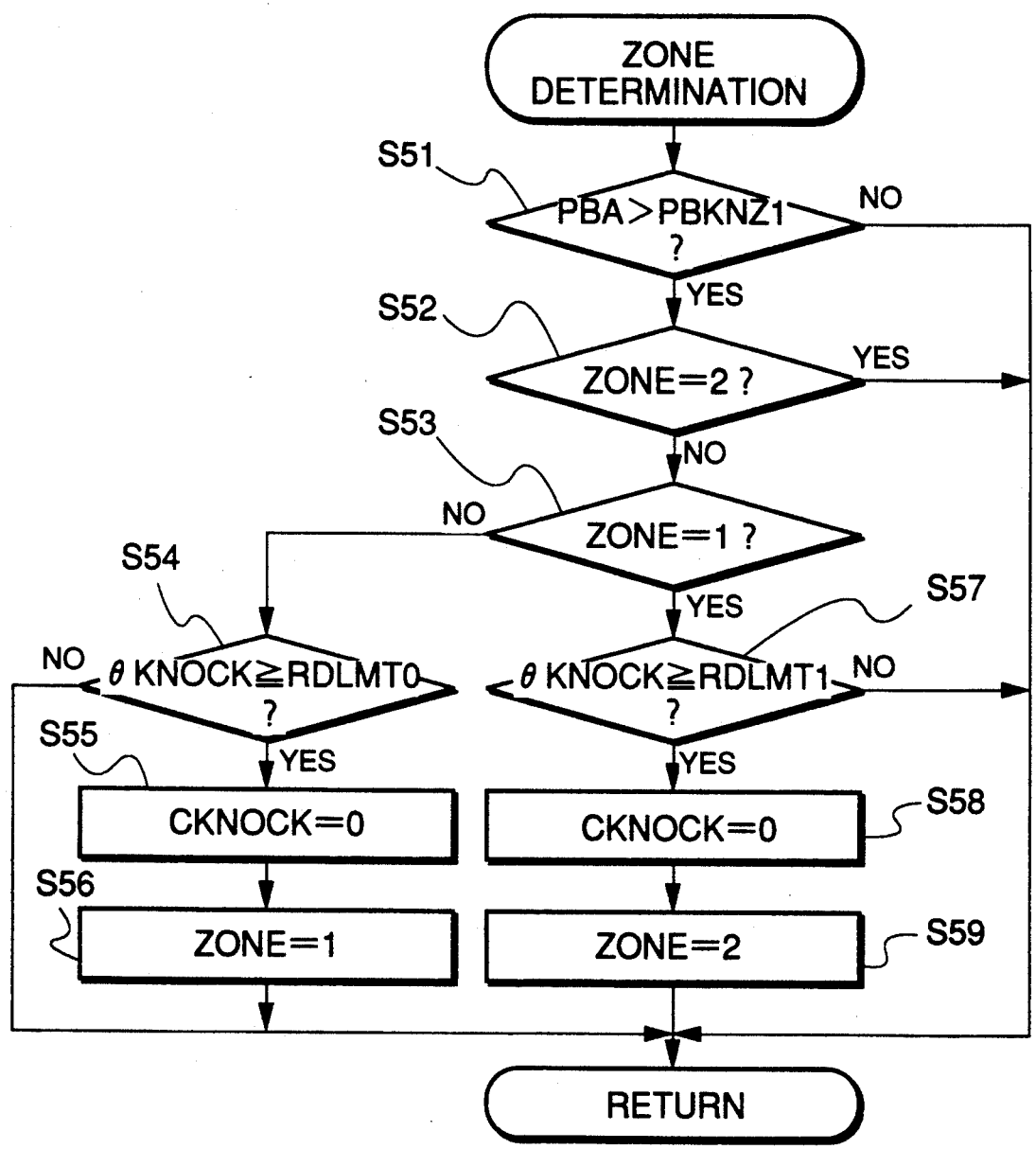
FIG. 8 is a flowchart showing a subroutine for determining and resetting control zones.

FIG. 8 shows a subroutine for determining the control zone.

First, at a step S51, it is determined whether or not the intake pipe absolute pressure PBA is higher than a first predetermined value PBKNZ1. The first predetermined value PBKNE1 is set at such a high value as will prevent erroneous determination of the control zone particularly when a fuel having a high octane value is used, the value being dependent on operating conditions of the engine, e.g. on the engine rotational speed.

If the answer to the question of the step S51 is negative (NO), the program is immediately terminated without effecting zone determination, whereas if the answer is affirmative (YES), the program proceeds to a step S52, where it is determined whether or not the control zone 2 is used in the present loop. If the answer to this question is affirmative (YES), the program is immediately terminated.

On the other hand, if the answer to the question of the step S52 is negative (NO), the program proceeds to a step S53, where it is determined whether the control zone 1 is used in the present loop. If the answer to this question is negative (NO), i.e. if the zone 0 is used in the present loop, it is determined at a step S54 whether or not the correction value θKNOCK is equal to or greater than the first retard side-discriminating value RDLMT0. If the answer to this question is negative (NO), i.e. if θKNOCK<RDLMT0, it is judged that the engine is in a state where the zone 0 should continue to be used for ignition timing control, and the program is immediately terminated. On the other hand, if the answer to the question of the step S54 is affirmative (YES), i.e. if θKNOCK≧RDLMT0, it is judged that the control zone 1 should be used, so that the count value of the knocking frequency counter CKNOCK is set to 0 at a step S55, and the control zone is set to the control zone 1 at a step S56, followed by terminating the program and returning to the main routine in FIG. 2.

On the other hand, if the answer to the question of the step S53 is affirmative (YES), i.e. if the zone 1 is used in the present loop, it is determined at a step S57 whether or not the correction value θKNOCK is equal to or greater than the second retard side-discriminating value RDLMT1. If the answer to this question is negative (NO), i.e. if θKNOCK<RDLMT1, the program is immediately terminated.

On the other hand, if the answer to the question of the step S57 is affirmative (YES), i.e. if θKNOCK≧RDLMT1, it is judged that the control zone 2 should be used, so that the count value of the knocking frequency counter CKNOCK is set to 0 at a step S58 and then the control zone is changed from the control zone 1 to the control zone 2 at a step S59, followed by terminating the subroutine and returning to the main routine in FIG. 2.

Figure 9A:
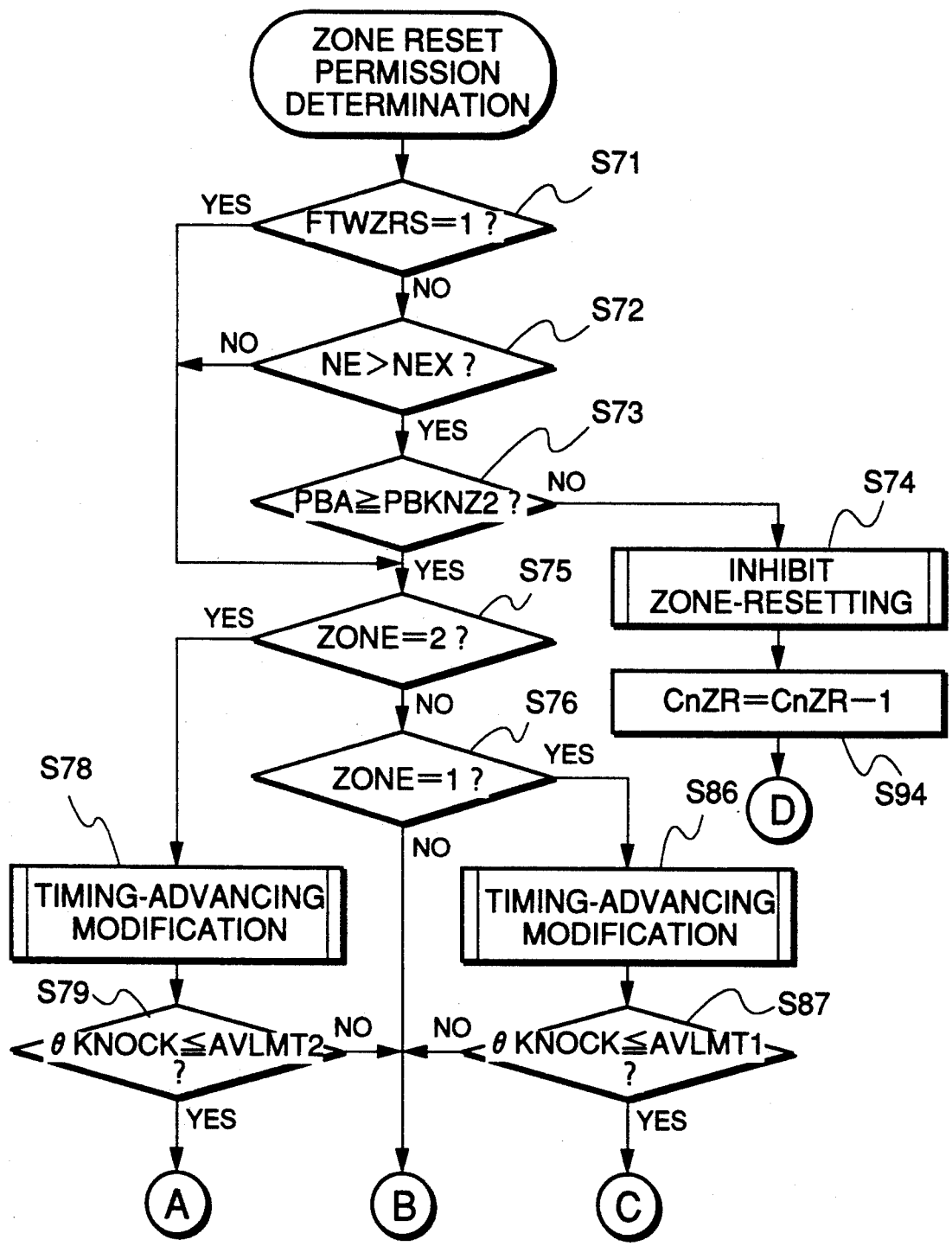
FIG. 9a is part of a flowchart showing a subroutine (1) for determining zone reset permission.
Figure 9B:
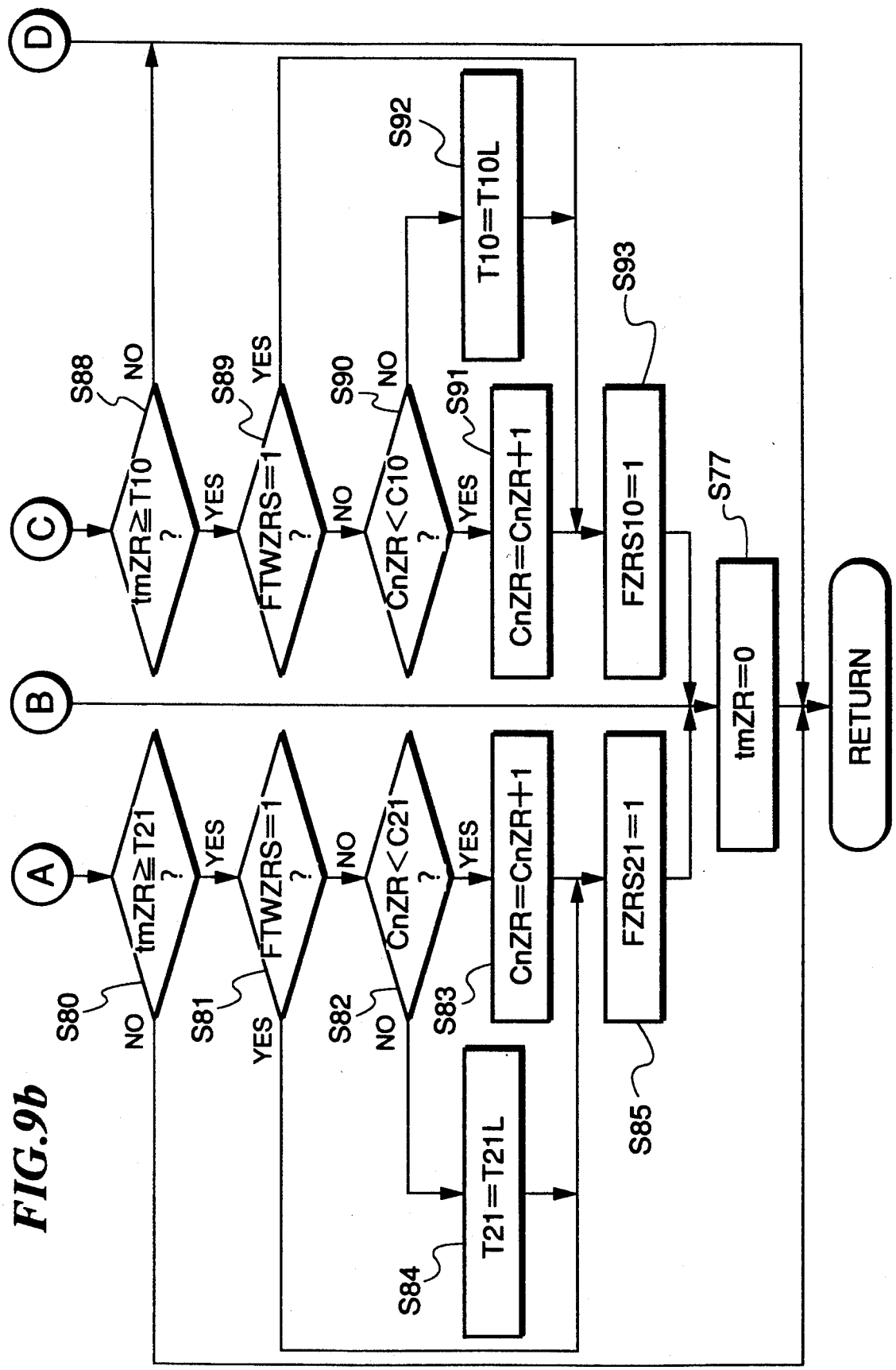
FIG. 9b is another part of the flowchart showing the zone reset permission-determining subroutine (1)
Figure 10:
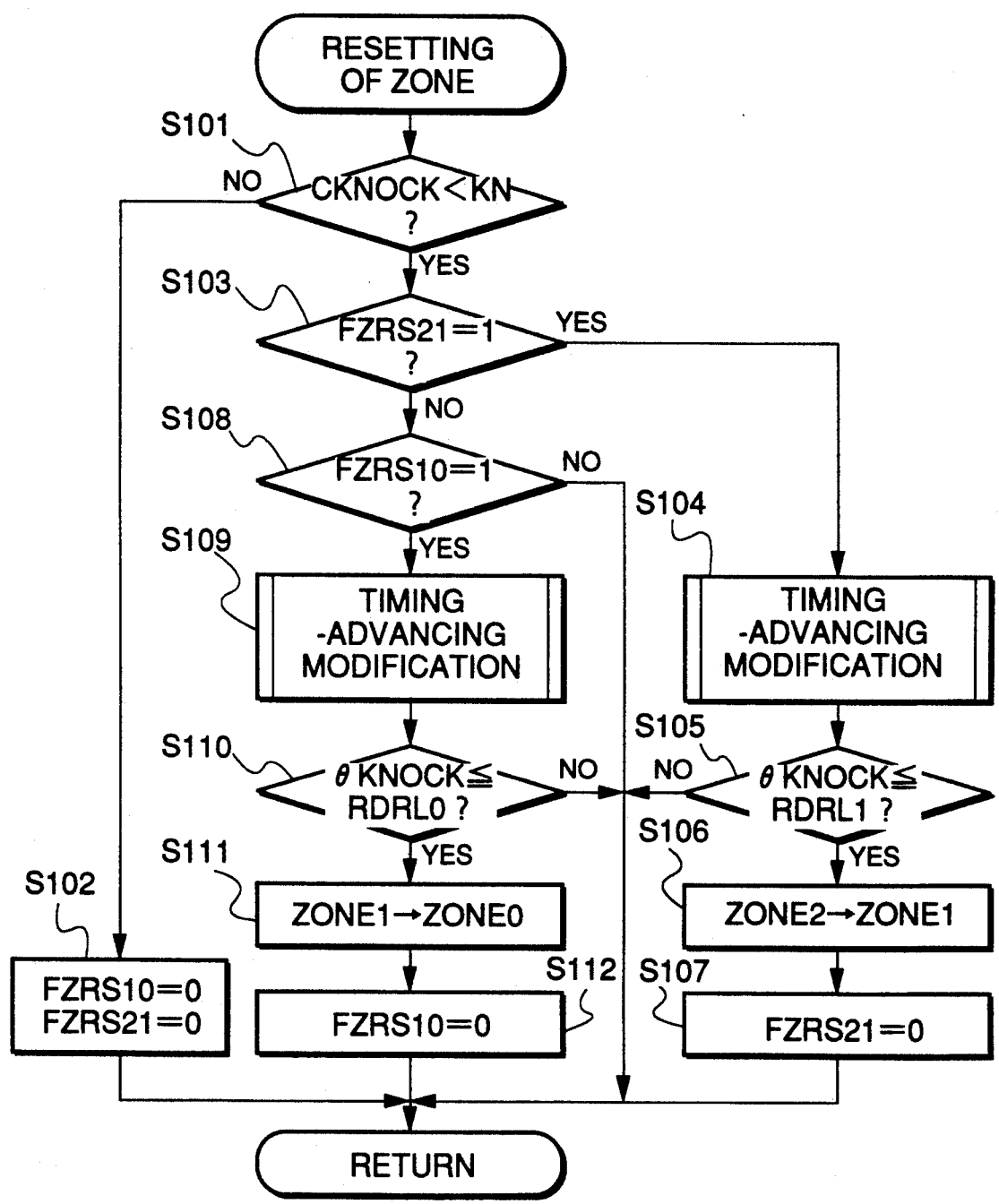
FIG. 10 is a flowchart showing a zone reset permission-determining subroutine (2)

At a step S7 in FIG. 2, a zone reset permission determination is carried out to change the control zone suitable to one for a fuel having a higher octane value. FIGS. 9a and 9b, and 10 show zone reset permission-determining subroutines (1) and (2) for determining whether the control zone is permitted to be changed.

According to the zone reset permission-determining routine (1) shown in FIGS. 9a and 9b, first, at a step S71, it is determined whether or not a flag FTWZRS is equal to "1". The flag FTWZRS is set to "1" when the engine coolant temperature TW is higher than a predetermined value, e.g. 60° C., which means that the engine has been warmed up. The flag FTWZRS is once set to 1 upon warming-up of the engine, i.e. when the coolant temperature Tw reaches the predetermined value, and thereafter it is reset to and held at 0. If the answer to the question of the step S71 is affirmative (YES), i.e. if FTWZRS=1, it is judged that the engine has just been warmed up, and the program jumps to a step S75, hereinafter referred to, to make a zone reset determination at the time of completion of warming-up of the engine, whereas if the answer is negative (NO), the program proceeds to a step S72, where it is determined whether or not the engine rotational speed NE is higher than a predetermined value NEX (e.g. 900 rpm). If the answer to this question is negative (NO), the program proceeds to the step S75, whereas if the answer is affirmative (YES), the program proceeds to a step S73, where it is determined whether or not the intake pipe absolute pressure PBA representative of load on the engine is higher than a second predetermined value PBKNZ2. The second predetermined value PBKNZ2 is set at such a value as is high enough to determine a high load condition of the engine, but is low enough to make it more smooth to change the control zone once set to a control zone suitable to a fuel having a higher octane value than to change the control zone in the opposite direction, without causing hunting in the controlled ignition timing control even if the control zone is erroneously set, that is, it is set to a value lower than the first predetermined value PBKNZ1, the value being dependent on an operating conditions of the engine, e.g. on the engine rotational speed NE. If the answer to the question of the step S73 is negative (NO), the resetting of the control zone is inhibited at a step S74, and a count value CnZR of a CnZK counter, hereinafter referred to, is decremented by 1, at a step S94, followed by terminating the subroutine. The lower limit of the count value of the CnZR counter is set to 0.

On the other hand, if the answer to the question of the step S73 is affirmative (YES), the program proceeds to the step S75, where it is determined whether or not the control zone 2 is used in the present loop. If the answer to this question is negative (NO), the program proceeds to a step S76, where it is determined whether the control zone 1 is used in the present loop. If the answer to this question is negative (NO), which means that the zone 0 is used in the present loop, a timer tmZR is set to "0" at a step S77, followed by terminating the program.

If the answer to the question of the step S75 or S76 is affirmative (YES), the program proceeds to a step S78 or S86, respectively.

At the step S78, the knocking correction value $\theta$KNOCK is subjected to a predetermined ignition timing-advancing modification where the $\theta$KNOCK value is decreased, as will be described in detail hereinafter with reference to FIG. 11. Then, it is determined at a step S79 whether or not the resulting knocking correction value $\theta$KNOCK has reached the advance limit AVLMT2 of the zone 2. If the answer to this question is negative (NO), the timer tmZR is reset and started at a step S77, followed by terminating the subroutine. On the other hand, if the answer to the question of the step S79 is affirmative (YES), it is determined at a step S80 whether or not the count value of the timer tmZR has reached a predetermined value corresponding to a time period T21 (e.g. 5 seconds). If the answer to this question is negative (NO), the subroutine is immediately terminated, whereas if the answer is affirmative (YES), it is determined at a step S81 whether or not the flag FTWZRS is equal to "1". If the answer to this question is affirmative (YES), the program proceeds to a step S85, whereas if the answer is negative (NO), the program proceeds to a step S82.

At the step S82, it is determined whether or not the count value CnZR of a CnZR counter is smaller than a predetermined value C21. The CnZR counter counts the number of times of determination of zone reset permission so as to increase the determination time number after the resetting of the control zone has long been inhibited, or otherwise, change the predetermined count value T21 of the timer TmZR applied at the step S80 to a longer value T21L, hereinafter referred to, within a short time.

On the first occasion, the answer to the question of the step S82 is affirmative (YES), and then the count value CnZR is increased by an incremental value of 1 at a step S83, and a preliminary zone reset permission-determining flag FZRS 21 is set to "1" at a step S85, and the timer tmZR is reset at the step S77, followed by terminating the program and returning to the FIG. 2 main routine.

On the other hand, if the answer to the question of the step S82 is negative (NO), the timer tmZR is set at a step S84 to a predetermined value T21L larger than the predetermined value T21 to make it more difficult to allow the control zone to be reset or changed, the zone reset permission-determining flag FZR21 is set to "1" at the step S85, and the timer tmZR is reset to "0" at the step S77, followed by terminating the program and returning to the FIG. 2 main routine.

On the other hand, if the answer to the question of the step S76 becomes affirmative (YES), and the program proceeds to a step S86 et seq. as well, the zone reset permission determination is carried out in a similar manner.

More specifically, at the step S86, the knocking correction value $\theta$KNOCK is subjected to a predetermined ignition timing-advancing modification where the $\theta$KNOCK value is decreased, as described hereinafter with reference to FIG. 11. Then, it is determined at a step S87 whether or not the resulting knocking correction value $\theta$KNOCK has reached the advance limit AVLMT1 of the zone 1. If the answer to this question is negative (NO), the timer tmZR is reset and started at step S77, followed by terminating the subroutine. On the other hand, if the answer to the question of the step S87 is affirmative (YES), it is determined at a step S88 whether or not the count value of the timer tmZR has reached a predetermine value corresponding to a time period T10 (e.g. 5 seconds). If the answer to this question is negative (NO), the subroutine is immediately terminated, whereas if the answer is affirmative (YES), it is determined at a step S89 whether or not the flag FTWZRS is equal to "1". If the answer to this question is affirmative (YES), the program proceeds to a step S93, whereas if the answer is negative (NO), the program proceeds to a step S90. At the step S90, it is determined whether or not the count value CnZR of the CnZR counter is smaller than a predetermined value C10. On the first occasion, the answer to the question of the step S90 is affirmative (YES), and then the count value CnZR is increased by an incremental value of 1 at a step S91, and a preliminary zone reset permission-determining flag FZRS10 is set to "1" at the step S93, and the timer tmZR is reset at the step S77, followed by terminating the program and returning to the FIG. 2 main routine.

On the other hand, if the answer to the question of the step S90 is negative (NO), the timer tmZR is set at a step S92 to a value T10L larger than the predetermined value T10 to make it more difficult to allow the control zone to be reset or changed, the zone reset permission-determining flag FZR10 is set to "1" at the step S93, and the timer tmZR is reset to "0" at the step S77, followed by terminating the program and returning to the FIG. 2 main routine.

At a step S8 in FIG. 2, the resetting of the control zone is carried out, according to the zone reset permission-determining subroutine (2) shown in FIG. 10.

First, at a step S101, it is determined whether or not the count value of the knocking frequency counter CKNOCK is equal to or smaller than a predetermined value KN to determine whether knocking has occurred. More specifically, whether or not knocking has occurred is determined by the ratio of the number of times of occurrence of knocking to a predetermined number of times of ignition. For example, if the number of times of occurrence of knocking is not more than 2 per 120 as the number of times of ignition, it is determined that knocking has not occurred.

If the answer to the question of the step S101 is negative (NO), the preliminary zone reset permission-determining flags FZRS10 and FZRS21 are both set to "0" at a step S102 to inhibit resetting or changing of the control zone, followed by terminating the subroutine.

On the other hand, if the answer to the question of the step S101 is affirmative (YES), it is determined whether or not the preliminary zone reset permission-determining flag FZR21 is equal to "1". If the answer affirmative (YES), the knocking correction value $\theta$KNOCK obtained at the step S5 of the FIG. 2 main routine is subjected to the aforementioned predetermined ignition timing-advancing or decreasing modification, at a step S104. Then, at a step S105, it is determined whether or not the resulting correction value $\theta$KNOCK is equal to or smaller than the second zone reset-determining value RDRL1. If the answer to this question is negative (NO), the program is immediately terminated, whereas if the answer is affirmative (YES), the control zone is changed from the control zone 2 to the control zone 1, at a step S106, and the zone reset permission-determining flag FZRS21 is reset to "0" at a step S107, followed by terminating the subroutine and returning to the main routine of FIG. 2.

On the other hand, if the answer to the question of the step S103 is negative (NO), it is determined whether or not he preliminary zone reset permission-determining flag FZR10 is equal to "1". If the answer to the question is negative (NO), the program is immediately terminated, whereas if the answer is affirmative (YES), the knocking correction value $\theta$KNOCK obtained at the step S5 of the main routine is subjected to the aforementioned predetermined ignition timing-advancing or decreasing modification, at a step S109. Then, at a step S110, it is determined whether or not the resulting correction value $\theta$KNOCK is equal to or smaller than the first zone reset-determining value RDRL0. If the answer to this question is negative (NO), the program is immediately terminated, whereas if the answer is affirmative (YES), the control zone is changed from the control zone 1 to the control zone 0, at a step S111, and the zone reset permission-determining flag FZRS10 is reset to 0 at a step S112, followed by terminating the subroutine and returning to the FIG. 2 main routine.

In addition, although in the present embodiment, the control zone is actually reset or changed when the knocking correction value $\theta$KNOCK obtained at the step S5 of the main routine and subjected to the predetermined ignition timing-advancing or decreasing modification is equal to or smaller than the predetermined value RDRL obtained by decreasing the retard side-discriminating value AVLMT by the predetermined amount, this is not limitative, but the system may be constructed such that a timer counts a time period having elapsed after the modified knocking correction value $\theta$KNOCK becomes equal to or smaller than the advance limit AVLMT, and the control zone is reset or changed when no knocking has occurred over a predetermined time period counted by the counter.

Returning to the main routine shown in FIG. 2, finally at a step S9, the ignition timing advance value is calculated for ignition timing control, based on the knocking correction value $\theta$KNOCK which belongs to the control zone obtained at the step S6, by the use of the following equation (1):

$$\theta IG = \theta IGM - \theta KNOCK \tag{1}$$

Figure 11:
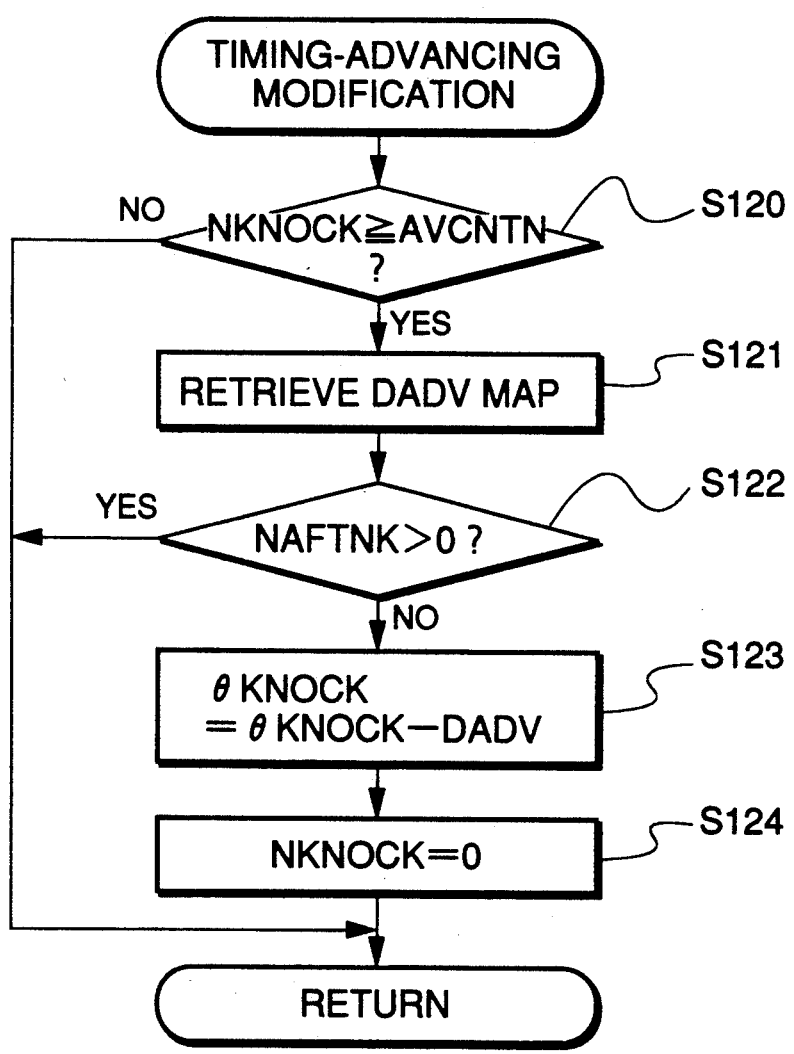
FIG. 11 is a flowchart showing a subroutine for ignition timing-advancing correction.

FIG. 11 shows a subroutine for carrying out the predetermined ignition timing-advancing or decreasing modification of the knocking correction value $\theta$KNOCK executed at the steps S78, S86, S104, and S109 in the zone reset permission-determining subroutines (1) and (2) shown in FIG. 9b and FIG. 10.

At a step S120, it is determined whether or not a continuous knockingless time number NKNOCK (the number of times of ignition at which knocking does not occur continuously) is equal to or greater than a predetermined value AVCNTN. If the answer is negative (NO), i.e. if NKNOCK<AVCNTN, the program is immediately terminated. If the answer is affirmative (YES) i.e. if NKNOCK≧AVCNTN, an advance unit amount DADV is read from a DADV map in accordance with the engine rotational speed NE and the intake pipe absolute pressure PBA. The DADV map is set, e.g. as shown in FIG. 12, such that optimum values of the advance unit amount DADV are provided, which correspond, respectively, to values of load on the engine PBKN0 to PBKN1 and values of the engine rotational speed NECT0 to NECT3. For example, if NECT0≦NE≦NECT1, and PBKN0≦PBA<PBKN1, a value of DADV11 is read from the map.

Then, at the following step S122, it is determined whether or not the continuous retarded ignition time number NAFTNK is greater than 0. If the answer to this question is affirmative (YES), it means that the ignition timing retardation is being carried out at the step S3 of the main routine by the use of the FIG. 3 subroutine. Accordingly, the program is immediately terminated.

On the other hand, if the answer to the question of the step S122 is negative (NO), i.e. if NAFTNK≦0, the advance unit amount DADV is decreased from the knocking correction value DIGKN at a step S123, and the continuous knockingless ignition time number NKNOCK is reset to "0" at a step 124, followed by terminating the program.

Thus, whenever the continuous knockingless ignition time number NKNOCK reaches the predetermined number AVCNTN, the knocking correction value θKNOCK is corrected in the advancing direction by the advance unit amount DADV. However, this correction is inhibited during the ignition timing retardation (NAFTNK>0).

What is claimed is:

1. In an ignition timing control system for an internal combustion engine, including operating condition-detecting means for detecting operating conditions of said engine including load on said engine, basic ignition timing-calculating means responsive to operating conditions of said engine detected by said operating condition detecting means, for calculating a basic value of ignition timing of said engine, knocking detecting means for detecting knocking occurring in said engine, knocking correction value-calculating means responsive to results of knocking detection from said knocking detecting means, for calculating a knocking correction value for correcting said ignition timing of said engine, advance limit-calculating means responsive to operating conditions of said engine detected by said operating condition-detecting means, for calculating an advance limit value, and advance correction-limiting means for limiting correction of said ignition timing of said engine in a direction of advancing said ignition timing beyond said advance limit value, when said knocking correction value exceeds said advance limit value, the improvement wherein said advance correction-limiting means operates when said load on said engine detected by said operating condition-detecting means exceeds a first predetermined value.

2. An ignition timing control system as claimed in claim 1, including basic value-setting means responsive to operating conditions of said engine detected by said operating condition-detecting means, for setting a predetermined reference value more advanced than said advance limit value, and advance correction limitation-cancelling means operable when said load on said engine exceeds a second predetermined value, for modifying said knocking correction value in said ignition timing-advancing direction toward said predetermined reference value and cancelling said limitation of said correction of said ignition timing in said ignition timing-advancing direction when said knocking correction value has been modified to said predetermined reference value while knocking is not detected by said knocking detecting means.

3. An ignition timing control system as claimed in claim 2, wherein said second predetermined value is set on a lower load side than said first predetermined value.

4. An ignition timing control system as claimed in any of claims 1 to 3, wherein said advance correction-limiting means comprises means for providing a plurality of control zones suitable for respective different octane values of fuel used in said engine, each of said control zones being defined by an upper limit value and a lower limit value of a retarding amount by which said ignition timing of said engine is to be corrected in a direction of retarding said ignition timing.

5. An ignition timing control system as claimed in claim 4, wherein said advance limit-calculating means calculates said lower limit of said retarding amount of each of said control zones as said advance limit value.

6. An ignition timing control system as claimed in claim 4, wherein said advance correction limitation-cancelling means cancels said limitation of said correction of said ignition timing in said ignition timing-advancing direction, by changing one of said control zones which is suitable for a fuel having a lower octane value to another one of said control zones which is suitable for a fuel having a higher octane value, when said load on said engine exceeds said second predetermined value.

7. An ignition timing control system as claimed in claim 4, wherein said advance correction-limiting means includes zone changing means for changing one of said control zones which is suitable for a fuel having a higher octane value to another one of said control zones which is suitable for a fuel having a lower octane value, when said load on said engine exceeds said first predetermined value and at the same time said knocking correction value exceeds said upper limit value of said retarding amount.

* * * * *